May 6, 1969 H. W. NIEMAN 3,442,086
JET TYPE AIR MOTOR
Filed Oct. 19, 1967 Sheet _1_ of 2
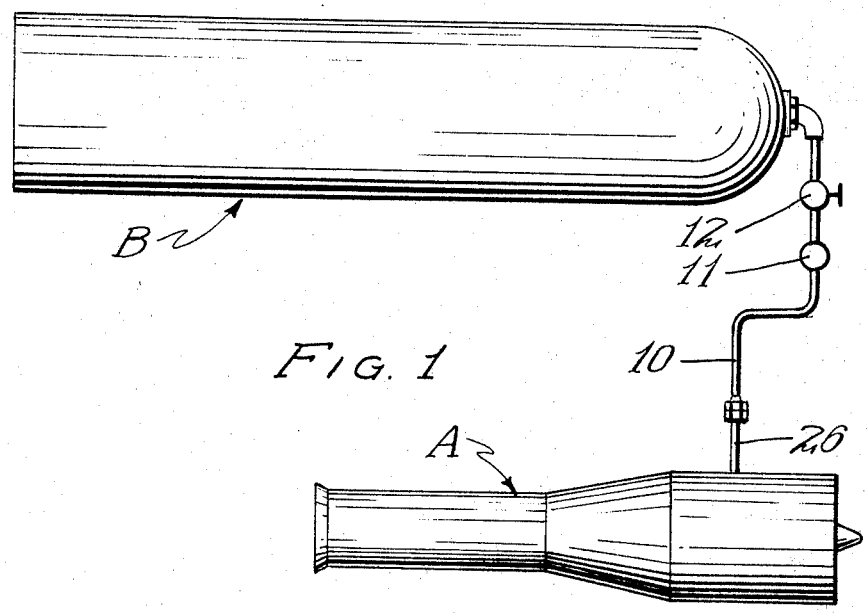
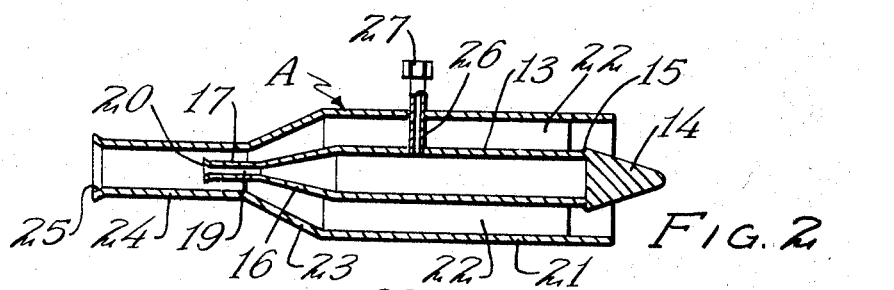
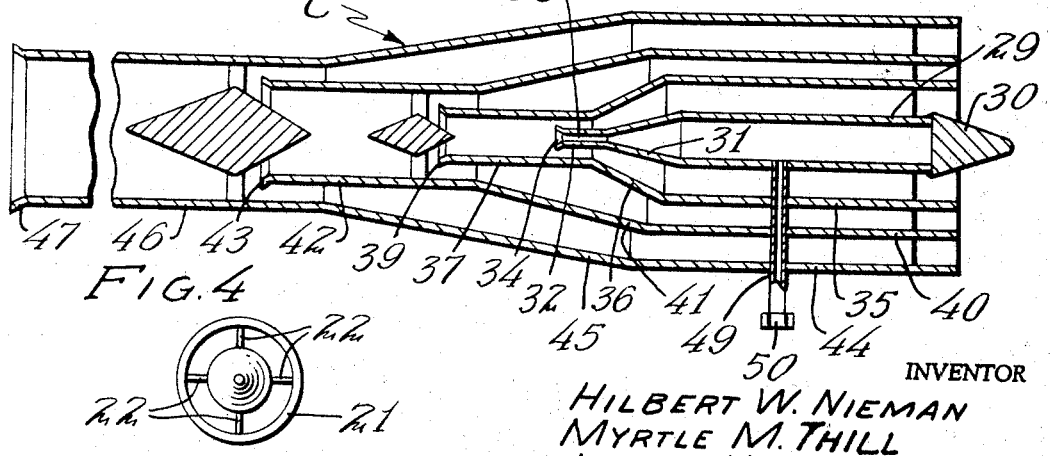
INVENTOR
HILBERT W. NIEMAN
MYRTLE M. THILL
LLOYD H. SATHRE
BY Robert m. Dunning ATTORNEY

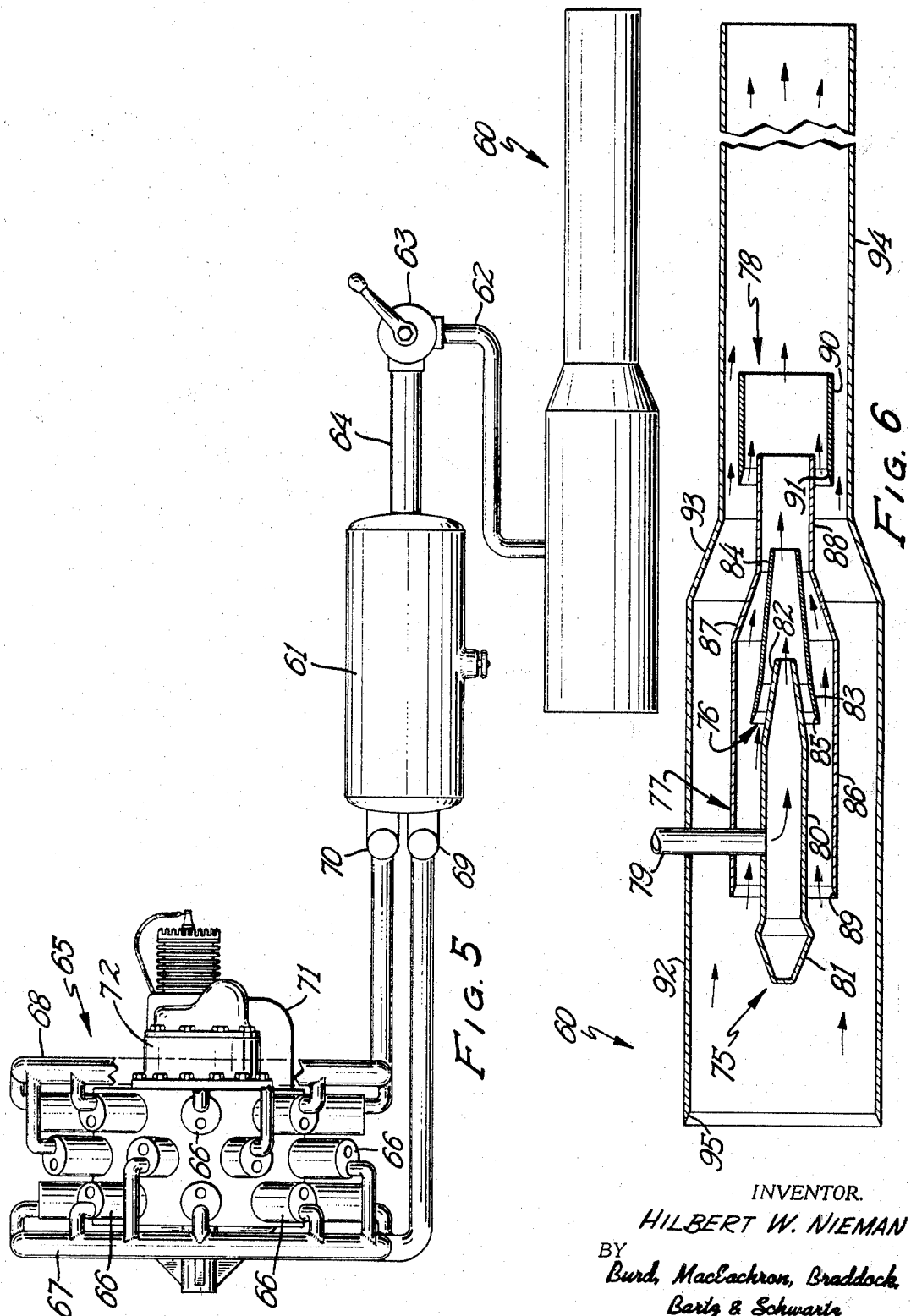

United States Patent Office 3,442,086
Patented May 6, 1969

3,442,086
JET TYPE AIR MOTOR
Hilbert W. Nieman, 941 W. Minnehaha Ave.,
St. Paul, Minn. 55104
Continuation-in-part of application Ser. No. 539,866,
Apr. 4, 1966. This application Oct. 19, 1967, Ser.
No. 676,445
Int. Cl. F02k 1/02; F04b 5/22
U.S. Cl. 60—269
8 Claims

ABSTRACT OF THE DISCLOSURE

A jet type motor driven by air under pressure expelled from a nozzle wherein further air is entrained from the surrounding atmosphere by a sleeve surrounding the nozzle. The sleeve has a relatively rapidly tapering first portion connected to a second portion that does not taper as the first portion does with the nozzle disposed in the second portion. Successive similar stages may be used.

---

This application is a continuation-in-part of my copending application. Inventor: Hilbert W. Nieman (formerly Lloyd H. Sathre et al.) Ser. No. 539,866, filed Apr. 4, 1966, now abandoned, for Jet Engine.

Background of the invention

This invention relates to an improvement in a jet type motor and deals particularly with a jet type motor operated by compressed air.

During recent years, the production of vehicles known as snowmobiles has greatly increased. These devices are propelled, in most instances, by a pair of parallel endless belts which support the rear of the vehicle, and are driven by a suitable type of engine. The front of the vehicle is usually equipped with a pair of parallel skis or runners which may be pivoted about a generally vertical axis to steer the vehicle.

An object of the present invention resides in the provision of a jet type motor which may be used to propel a vehicle of this type, as well as vehicles of other types, including aircraft, thereby eliminating the drive belts which are usually the parts which wear out most quickly. In view of the fact that the motor is a pressurized unit without fuel or combustion, the motor will function equally well under any type of weather conditions.

One form of the present invention provides a jet type motor which includes an elongated hollow chamber which tapers in diameter at its rear end to support a longitudinally extending open ended tube of small diameter. Compressed air under relatively high pressure is communicated to the interior of this hollow chamber. Encircling the elongated body of the chamber is a coaxial sleeve portion which is connected at its rear end by a frustoconical shell portion to a rearwardly extending sleeve portion of smaller diameter. The sleeve portion at the rear of the frustoconical portion extends well beyond the rear end of the small diameter tube. When the interior of the chamber is subjected to air under pressure, the air flows through the small diameter which forms a compression chamber, and the outer sleeve acts as a venturi to draw air through the open front end of the outer sleeve, through the frustoconical portion, and out through the relatively small diameter rearwardly extending tube. This causes a reduction or a vacuum which pulls the motor forward, and an increase in pressure rearwardly of the motor, and acts to propel the motor in a longitudinal direction.

The presently preferred form of the invention provides a jet type motor which includes an elongated chamber having a closed forward end, an inlet and a tapered rear end terminating in an outlet. The chamber is surrounded by a sleeve having a first portion at least part of which tapers relatively rapidly and a second portion at least tapering less rapidly than the tapering part of the first portion. The outlet of the pressure chambler lies within the second portion of the sleeve for obtaining maximum power. An air conducting conduit is connected to the pressure chamber for supplying air under pressure to the chamber. This form of the invention operates in a manner similar to the form previously described.

A feature of the present invention resides in the fact that the motor may have a large number of stages which tends to increase the efficiency of operation. To provide an additional stage, a second sleeve is provided which encircles at least part of the first mentioned sleeve and is concentric therewith, extending rearwardly somewhat beyond the end of the first sleeve. The rear end of the first sleeve is positioned within the second sleeve rearwardly of an internal neck formed at the junction between the small end of a relatively rapidly tapering part of the second sleeve and a portion thereof which at least tapers less rapidly. As the air under pressure leaves the rear end of the small diameter end of the first sleeve, it creates a venturi action within the small diameter end of the second sleeve, causing air to flow between the two sleeves and out the rear end of the motor. Additional stages may be added, each stage including a sleeve bearing the same relation to the sleeve of the immediately preceding stage as the second sleeve bears to the first sleeve.

A feature of the present invention resides in the provision of a jet type motor as described which takes considerable compressed air to start the vehicle in motion, and which takes progressively less air as the speed of the vehicle increases. In other words, once the vehicle is in motion at relatively high speed, the volume of air under pressure required to keep it in motion is materially reduced.

These and other objects and novel features of the present invention will be more clearly and fully set forth in the following specification and claims:

In the drawings

FIGURE 1 is a diagrammatic view of a single stage jet motor showing the general arrangement of parts;

FIGURE 2 is a vertical sectional view through the motor illustrated in FIGURE 1;

FIGURE 3 is a front elevational view of the motor shown in FIGURE 2;

FIGURE 4 is a vertical sectional view through a three stage engine made in accordance with the present invention;

FIGURE 5 is a diagrammatic side view of a system utilizing a modified jet motor according to the invention; and FIGURE 6 is a vertical section through a part of the motor of FIGURE 5.

Referring now to FIGURES 1–3, a jet type motor A is preferably powered by compressed air from a tank B or other power supply. Tank B is connected to engine A by a suitable conduit 10 containing a control such as 11, and also usually containing a pressure regulating valve such as 12 which may be used to maintain the pressure of the air constant during operation.

As indicated in FIGURE 2, motor A is shown as including an elongated hollow body or chamber 13 which may be of tubular or cylindrical form. The forward end of chamber 13 is preferably closed by a generally conical front end closure 14, the large diameter end of which is indicated at 15 of somewhat larger outer diameter than tubular chamber body 13. The rear end of generally cylindrical body 13 is tapered or is frustoconical, the frustoconical connecting portion being indicated by the numeral 16 and being integral with the rear end of tubular chamber body 13.

A tube 17 having a small diameter passage 19 extending longitudinally therethrough is provided at the rear end of frustoconical connection portion 16. The rear end of tube 17 can be flared outwardly to some extent as indicated at 20, if desired.

A substantially cylindrical first stage sleeve part 21 is supported in concentric relation to elongated chamber body 13 by longitudinally extending radially mounted fins such as 22. These fins are perhaps best illustrated in FIGURE 3. The forward end of sleeve part 21 usually encircles tapered forward end 14 of chamber 13. The rear end of sleeve part 21 is provided with a substantially frustoconical shell part 23 which is connected at its large diameter forward end to the rear end of sleeve part 21. Connecting part 23 connects sleeve part 21 with a relatively small diameter exhaust sleeve portion 24 which encircles tube 17 and projects rearwardly well beyond the rear end of tube 17. The rear end of small diameter exhaust sleeve portion 24 can also be outwardly flared as indicated at 25, if desired.

A tubular connection 26 extends through outer sleeve part 21 and through the wall of chamber 13 to communicate with the interior thereof. This tubular connection 26 is joined to conduit 10 by a suitable connector such as 27.

When air under pressure is conducted to the interior of hollow chamber 13 from tank B, this air is forced through passage 19 of tube 17 at an extremely high rate of speed. As this air flows through exhaust sleeve portion 24 of the outer enclosure, the outer enclosure acts as a venturi to draw air through the ring-shaped space between body 13 and sleeve part 21, through frustoconical connecting part 23, and outwardly through exhaust sleeve portion 24. The vacuum forwardly of the engine is accordingly increased.

FIGURE 4 illustrates a typical modification in which various stages may be added to the engine shown in FIGURES 1 through 3. As indicated, as engine C, indicated in FIGURE 4, includes an inner elongated chamber here shown as tubular body 29 having a pointed substantially conical forward end 30, the purpose of this arrangement being to direct the air flowing over conical end 30 uniformly through the encircling sleeve. A substantially frustoconical connecting portion 31 has its large diameter forward and is connected to the rear end of tubular body 29. A small diameter tube 32 having a small diameter passage 33 therethrough is connected to the small diameter end of connecting portion 31. The rear end of tube 32 may be outwardly flared as indicated at 34.

As will be noted from a comparison of FIGURES 2 and 4, chamber 29 may be virtually identical to pressure chamber 13 previously described. A first stage sleeve part 35 which encircles pressure chamber 29 is, or may be, identical with sleeve 21 previously described.

First stage sleeve part 35 has an open forward end and is connected at its rear end to a tapered of frustoconical shell part 36, the small diameter end of which supports an exhaust sleeve portion 37 which projects well beyond rear end 34 of tube 32. Sleeve 37 is concentric with tube 31, and may also be provided with an outwardly flared rear end 39.

The second stage includes a sleeve part 40 which is concentric with sleeve part 35 and encircles the same. The forward end of sleeve part 40 may be on a common plane with the forward end of the sleeve part 35, which plane is normal to the axis of the device. The rear end of sleeve part 40 is connected by a substantially frustoconical connecting part 41 to an exhaust sleeve portion 42 concentric with, and spaced outwardly from, sleeve 37. As indicated, the read end of frustoconical part 41 is rearwardly of the rear end of frustoconical part 36, and exhaust sleeve portion 42 extends well beyond the rear end of exhaust sleeve portion 37. The rear end of sleeve part 42 can also be outwardly flared as indicated at 43.

A third stage sleeve part 44 is shown encircling sleeve part 40 and having a forward end which also may be on the plane of the forward ends of sleeve parts 35 and 40. The rear end of sleeve part 44 is connected by a frustoconical connecting part 45 to an exhaust sleeve portion 46 which is concentric with, and spaced outwardly from, exhaust sleeve portion 42. The rear flared end 47 of sleeve portion 46 is spaced a susbtantial distance behind rear end 43 of sleeve portion 42.

A connecting tube 49 extends through sleeve parts 35, 40, and 44 and extends through a wall of tubular chamber 29. Connecting tube 49 is provided with a suitable connecting fastening 50 by means of which the tube 49 may be connected to conduit 10 leading to compressed air tank B.

While not specifically indicated in the drawings, the various sleeve parts 35, 40, and 44 are supported in concentric relation to the tubular chamber 29 by means of radially extending fins or other such means which provide a minimum of interference with the air passing through the sleeves, and which hold the various sleeves in concentric relation. These fins, such as 22, may extend the full length of the inner unit or may extend only throughout the length of the larger diameter sleeve parts. This depends upon a number of stages and the length of the various stages.

In operation, air from tank B enters pressure chamber 29 and flows at a high velocity through passage 33 in the small diameter tube 32. This creates a tendency for the air to flow through the open forward end of sleeve part 35, about pressure chamber 29, and outwardly through exhaust sleeve portion 37.

The flow of air under pressure through the exhaust sleeve portion 37 creates a venturi action inside exhaust sleeve portion 42, tending to draw air through the open forward end of sleeve part 40, and between sleeve parts 35 and 40, between frustoconical connecting parts 36 and 41, and between exhaust sleeve portions 37 and 42.

The flow of air through exhaust sleeve portion 42 creates a similar venturi action tending to draw air through the third stage of the engine. As the air leaves rear end 43 of sleeve portion 42, air is drawn through the outer sleeve part 44, between the frustoconical connecting parts 41 and 45, and between exhaust sleeve portions 42 and 46. The air leaves through the rear end of exhaust sleeve portion 46.

FIGURES 5 and 6 disclose a modification of the jet type motor of the invention which represents the presently preferred form. The jet type motor has an outer housing, generally designated 60, and is connected to an air pressure tank or reservoir 61 by an air conducting line 62, a throttle valve 63, and an air conducting line 64. Throttle valve 63 controls the supply of air under pressure to jet type motor housing 60.

A high pressure, high volume compressor, generally designated 65, is here shown as a radial piston type compressor having three staggered banks of pistons disposed in cylinders 66. The air compressed in cylinders 66 is supplied to reservoir 61 through a pair of high pressure air conducting lines 67 and 68 and a pair of check valves 69 and 70 which allow the air to flow from compressor 65 to reservoir 61 but prevent it from flowing back into compressor 65. Compressor 65 can be driven by an internal combustion engine 71 through a drive shaft and gearing arrangement contained in a gear box 72.

The structure of the jet type motor within outer housing 60 is shown in FIGURE 6. Housing 60 contains a pressure chamber, generally designated 75; a first sleeve, generally designated 76; a second sleeve, generally designated 77; a third sleeve, generally designated 78; and a conduit 79 connecting an inlet into pressure chamber 75 to air pipe 62. Pressure chamber 75 and sleeves 76, 77 and 78 are supported in position by radial fins attached to housing 60. Those fins have been omitted from FIGURE 6 for the sake of clarity.

Pressure chamber 75 includes a tubular body portion 80, a closed generally conically shaped forward end 81, and a frustoconically shaped rear end 82 tapering to a small outlet. Pressure chamber 75 is designed so that the outlet at the small end of portion 82 is smaller than the inlet where conduit 79 joins tubular body 80. In this manner, relatively high pressure is always maintained in pressure chamber 75.

First sleeve 76 encircles the rear end of pressure chamber 75 and includes a first portion 83 which tapers relatively rapidly from front to back. First portion 83 is connected, at its rear end, to a second portion 84 which at least tapers less rapidly than first portion 83. Sleeve 76 also has an internally tapered, leading knife edge 85. First sleeve 76 is positioned so that the outlet of pressure chamber 75 lies within second portion 84 rearward of an internal neck formed by the junction between portions 83 and 84.

Second sleeve 77 is positioned to encircle at least a portion of pressure chamber 75 and all of first sleeve 76. Second sleeve 77 includes a first portion 86 which encloses substantially equal cross sectional areas perpendicular to its length at all points along its length. That is, if sleeve portion 86 is cylindrical, it has relatively constant diameter from front to back. The rear end of first portion 86 is connected to a second portion 87 which, in turn, is connected to a third portion 88. Third portion 88 also encloses substantially equal cross sectional areas perpendicular to its length at all points along its length. The cross sectional areas enclosed by portion 88 are however, smaller than those enclosed by portion 86. That is, when cylindrical sleeve portions are used, portion 88 has a smaller diameter than portion 86. Connecting portion 87 encloses cross sectional areas which decrease along its length from the point at which it is connected to portion 86 to the point at which it is connected to portion 88. When cylindrical sleeve portions 86 and 88 are used, portion 87 is frustoconical. Second sleeve 77 is positioned so that the rear end of first sleeve 76 lies within third portion 88 rearwardly of the neck formed between the smaller end of portion 87 and the forward end of portion 88.

Sleeve 77 need not be cylindrical. It can have a cross sectional shape, perpendicular to its length, defining any closed hollow polygon as well as a circle. The same is true of first sleeve 76 and pressure chamber 75.

Third sleeve 78 encloses substantially equal cross sectional areas perpendicular to its length at each point along the major portion of its length which is designated by the numeral 90. The forward portion of sleeve 78 is tapered internally to a knife edge 91. The rear end of second sleeve 77 lies within third sleeve 78 and is positioned rearwardly of the junction between the internally tapered portion and relatively constant diameter portion 90.

Outer housing or sleeve 60 has a first forward portion 92 which encloses substantially equal cross sectional areas perpendicular to its length at all points along its length. The rear edge of portion 92 is connected to a second portion 93 which encloses decreasing cross sectional areas perpendicular to its length at all points along its length from the junction with portion 92 to a junction with a third portion 94. Third portion 94 encloses substantially equal cross sectional areas perpendicular to its length at all points along its length. The forward end of outer housing 60 is tapered inwardly to a knife edge at 95. Pressure chamber 75 and first, second and third sleeves 76, 77 and 78 all lie entirely within outer sleeve 60. Pressure chamber 75 is disposed within outer sleeve or housing 60 so that knife edge 95 protrudes beyond the leading edge of closed forward end 81. The rear end of second sleeve 77 is positioned within third portion 94 so that satisfactory operation can be obtained even without a third sleeve 78. However, it has been discovered that operation is enhanced by the presence of third sleeve 78 which is positioned entirely within third portion 94.

As shown in FIGURE 6, pressure chamber 75, first sleeve 76, second sleeve 77, third sleeve 78 and outer sleeve or housing 60 preferably are disposed on a common longitudinal axis. Experiments have been conducted to determine the best front to back relation between each of the various elements and have resulted in the design illustrated in FIGURE 6. Several features there shown have been determined to be important to efficient operation of the device. For example, it has been found that better operation is achieved when the leading edge of closed front end 81 lies to the rear of knife edge 95. Experimentation has also shown that it is particularly advantageous to position the outlet of each sleeve to the rear of the neck between the rapidly tapering part and the portion which tapers at least less rapidly of the surrounding sleeve. When the outlets were moved forward of those necks, the device appeared to have great power when not loaded but was found to have very little power when a load is applied. The structure, as shown, with the rear end of each stage rearwardly of the neck was found to have more power when loaded than any other positioning. Although exactly why is not clear, the addition of sleeve 78 increases power substantially. Motors identical to the one shown in FIGURE 6 except for omitting sleeve 78 where noticeably less forceful when a given presure was applied to chamber 75 than when sleeve 78 was present.

The manner in which additional stages may be added is believed obvious from the foregoing description. The number of stages which may be successfully used obviously depends upon the air pressure, the rate of flow of air, the proportions between the various venturi devices, and the like. The device is similar to a jet engine of the fuel burning type in that the motor is relatively uneconomical while the vehicle is starting into motion. However, tests have shown that as the vehicle and motor move and increase in speed, the air under pressure required to maintain the speed reduces. At speeds in excess of ten miles per hour, it is believed that a large percentage of the thrust produced results from air entering past edge 95 from the surrounding atmosphere. If desired, auxiliary means may be provided for getting the vehicle underway, after which time the jet type motor may be used to keep the vehicle operating at a desired rate of speed.

As shown in FIGURE 5, the capacity of the compressor and the conduits leading to tank 61 are greater than the conduit 64 which in turn has greater capacity than throttle valve 63 and conduit 62. The inlet portion 79 of conduit 62, as shown in FIGURE 6, is of greater capacity than nozzle 82. For this reason, throttle valve 63 may be wide open and air escaping at nozzle 82 will not cause an appreciable pressure drop in chamber 75. Thus full power is available throughout the range of throttle valve 63 on a continuous basis as long as compressor 65 continues to function normally. To be accurate in a shop drawing sense, the size of nozzle 82 should be shown smaller than it is in comparison to inlet pipe 79. It was retained at its present size in the drawings simply to make it clear that there is an outlet opening. A good rule of thumb is to have inlet pipe 79 about four times the capacity of nozzle 82.

The embodiments of the invention in which an exclusive property or privilege is claimed are defined as follows:

1. A jet type motor comprising:
   an elongated chamber having an inlet, a closed forward end, and a tapered rear end terminating in an outlet;
   a conduit communicating with the inlet for supplying air under pressure to the chamber;
   a first sleeve having a first portion with at least part thereof tapering relatively rapidly with the smaller end of the tapering part connected to a second portion which at least tapers less rapidly than the tapering part of the first portion and having a rear end, a portion of the chamber being positioned within the first portion of the first sleeve and a further portion of the chamber including the outlet being positioned within the second portion of the first sleeve with the second portion extending rearwardly a substantial distance from the chamber outlet; and a second sleeve having a first portion connected by a second portion to a third portion, the first portion enclosing substantially constant cross sectional areas perpendicular to its length at all points therealong, the third portion enclosing substantially constant cross sectional areas perpendicular to its length smaller than those enclosed by the first portion at all points therealong, and the second portion having cross sectional areas perpendicular to its length decreasing along its length from that of the first portion to that of the third portion, the second sleeve being positioned so that the rear end of the first sleeve lies within the third portion of the second sleeve.

2. A jet type motor according to claim 1 which further comprises:
 a high pressure, high capacity air compressor;
 throttle valve means for controlling the supply of air under pressure to the conduit; and
 air conducting means connecting the valve means between the compressor and the conduit.

3. A jet type motor according to claim 2 wherein the compressor is a radial piston compressor.

4. A jet type motor according to claim 1 wherein the first sleeve is positioned entirely within the second sleeve with the first portion of the first sleeve positioned entirely within the first portion of the second sleeve.

5. A jet type motor according to claim 4 which further comprises:
 an outer housing having open front and rear ends and a first portion connected by a second portion to a third portion, the first portion enclosing substantially constant cross sectional areas perpendicular to its length at all points therealong, the third portion enclosing substantially constant cross sectional areas perpendicular to its length smaller than those enclosed by the first portion at all points along the length of the second portion, and the second portion having cross sectional areas perpendicular to its length decreasing along its length from that of the first portion to that of the third portion; and wherein the chamber, first sleeve and second sleeve lie entirely within the outer housing with the front end of the housing protruding beyond the front end of the chamber; and the second sleeve has a rear end positioned within the third portion of the outer housing.

6. A jet type motor according to claim 5 which further comprises a third sleeve enclosing substantially constant cross sectional areas at all points along the majority of its length and internally tapered to a knife edge at its front end, the third sleeve being positioned entirely within the third portion of the outer housing and having the rear end of the second sleeve positioned within it.

7. A jet type motor according to claim 6 wherein the front ends of the outer housing, first sleeve and second sleeve each taper internally to a knife edge.

8. A jet type motor according to claim 1 and which further comprises means for reducing an effective cross sectional area through which air can flow at the rear end of the first sleeve below that in at least part of second portion thereof.

References Cited

UNITED STATES PATENTS

| | | | |
|---|---|---|---|
| 1,172,450 | 2/1916 | Griffin | 230—95 |
| 1,375,601 | 4/1921 | Morize | 60—269 XR |
| 2,364,211 | 12/1944 | Gustafson | 230—95 |
| 2,390,161 | 12/1945 | Mercier | 60—269 XR |
| 3,323,304 | 6/1967 | Llobet et al. | 60—39.49 |

FOREIGN PATENTS

| | | |
|---|---|---|
| 518,485 | 1/1921 | France. |
| 612,362 | 4/1935 | Germany. |
| 26,633 | 1909 | Great Britain. |

CARLTON R. CROYLE, *Primary Examiner.*

U.S. Cl. X.R.

230—104